United States Patent [19]
Jones

[11] Patent Number: 5,883,336
[45] Date of Patent: Mar. 16, 1999

[54] AUTOMATIC LOT CONTROL AND PART HANDLER

[75] Inventor: Johnnie L. Jones, Rockford, Mich.

[73] Assignee: Accra-Wire Controls Inc., Rockford, Mich.

[21] Appl. No.: 820,074

[22] Filed: Mar. 19, 1997

[51] Int. Cl.$^6$ .......................... G01G 19/42; G01G 13/22
[52] U.S. Cl. .......................... 177/25.17; 177/54; 177/84; 177/119; 177/146; 141/83
[58] Field of Search ................... 177/54, 55, 83, 177/84, 119, 120, 145, 146, 253, 25.17, 86, 87, 154, 155, 156; 141/83

[56] References Cited

U.S. PATENT DOCUMENTS

| | | | |
|---|---|---|---|
| 2,081,122 | 5/1937 | Stetson | 222/52 |
| 2,280,614 | 4/1942 | Ayars | 222/52 |
| 2,455,433 | 12/1948 | Matsen et al. | 222/52 |
| 2,634,085 | 4/1953 | Allen et al. | 177/54 |
| 2,661,881 | 12/1953 | Kasper | 222/52 |
| 2,781,995 | 2/1957 | Magnuson et al. | 177/52 |
| 3,112,000 | 11/1963 | Morris et al. | 177/52 |
| 3,200,451 | 8/1965 | Worswick | 177/54 |
| 3,556,234 | 1/1971 | Moreno | 177/46 |
| 3,557,888 | 1/1971 | Stambera | 177/1 |
| 3,738,077 | 6/1973 | Leach | 177/52 |
| 3,997,014 | 12/1976 | Soderholm et al. | 177/155 |
| 4,519,506 | 5/1985 | Spaanderman | 177/55 |
| 4,726,435 | 2/1988 | Kitagawa et al. | 177/154 |
| 5,064,009 | 11/1991 | Melcher et al. | 177/145 |
| 5,115,874 | 5/1992 | Hayahara et al. | 177/145 |
| 5,115,876 | 5/1992 | Chang et al. | 177/146 |
| 5,259,425 | 11/1993 | Johnson et al. | 141/12 |

OTHER PUBLICATIONS

Accra–Wire Controls Lot Control And Parts Handlers, Jul. 1995.

*Primary Examiner*—Randy W. Gibson
*Attorney, Agent, or Firm*—Price, Heneveld, Cooper, Dewitt & Litton

[57] ABSTRACT

A lot control and part handling apparatus having a base adapted to support the apparatus and a plurality of containers. Each of the containers is shaped to be filled with and retain therein multiple parts having a predetermined cumulative weight. A container support table is mounted on the base for rotation about a generally vertical axis and has a plurality of container support stations on which the containers are removably supported. A motor selectively rotates the container support table to sequentially position each of the container support stations at a fill position at which the parts are loaded into one of the containers. A weighing apparatus is positioned in vertical registry with the fill position and includes a scale with a vertically reciprocating lift member thereon which selectively and sequentially engages an associated one of the containers. A controller is operably connected with the weighing apparatus and motor and rotates the container support table to shift a first, empty one of the containers into the fill position. The lift member is extended to engage the first container, which is located in the fill position, to support the same and any parts therein on the scale until the predetermined cumulative weight is reached. The lift member is then retracted to support the first container and the parts therein on the container support table. The controller then rotates the container support table to shift a second, empty one of the containers into the fill position.

20 Claims, 2 Drawing Sheets

AUTOMATIC LOT CONTROL AND PART HANDLER

BACKGROUND OF THE INVENTION

The present invention relates to parts handling apparatus and the like, and in particular to an apparatus that accurately counts piece parts by their cumulative weight.

Small parts, such as nails, screws, rivets and the like are commonly fabricated at very high rates of speed, and are collected and sold in predetermined lot sizes, each lot having a set number of parts. Heretofore, the handling and lot control for such parts has typically been achieved by parts counters which keep track of the number of parts being manufactured by the fabrication machine either by time or actual part count. While such systems do provide lot control, they can have certain drawbacks. For example, if the fabricating machine breaks down, and must be restarted, prior lot control systems can loose accurate count. Also, if certain parts are defective, and are removed from the stream of parts, an accurate lot count cannot be established.

A final step in the packaging process typically includes weighing the package for purposes of determining shipping cost and/or pricing the sale. Since prior parts handling devices normally use an actual parts count for lot control, weighing the final package is an additional step in the shipping process. Therefore, there was a need for an automatic lot control and part handler that is adaptable for use with numerous types of fabricating machines to determine the lot size automatically at the time of manufacture, based on either the weight of the lot or by time-interval, and having capability for unattended operation.

SUMMARY OF THE PRESENT INVENTION

The present invention provides a lot control and part handling apparatus having a base adapted to support the apparatus. The apparatus includes a plurality of containers, each being shaped to be filled with and retain therein multiple parts having a predetermined cumulative weight. A container support table is mounted on the base for rotation about a generally vertical axis and has a plurality of container support stations on which the containers are removably supported. A motor selectively rotates the container support table to sequentially position each of the container support stations at a fill position at which parts are loaded into one of the containers. A weighing apparatus is positioned in vertical registry with the fill position and includes a scale with a vertically reciprocating lift member thereon which selectively and sequentially engages an associated one of the containers. A controller is operably connected with the weighing apparatus and motor and rotates the container support table to shift a first, empty one of the containers into the fill position. The lift member is then extended to engage the first container, which is located in the fill position, to support the same and any parts therein on the scale until the predetermined cumulative weight is reached. At that time the lift member is retracted to support the first container and the parts therein on the container support table. The controller then rotates the container support table to shift a second, empty one of the containers into the fill position.

Another aspect of the present invention is to provide a lot control and part handling apparatus having a base adapted to support the apparatus. A container support table is mounted on the base for rotation about a generally vertical axis and has a plurality of container support stations on which the containers are removably supported. Each of the container support stations has an open bottom portion. A motor selectively rotates the container support table to sequentially position each of the container support stations at a fill position at which the parts are loaded into an associated one of the containers. A weighing apparatus is positioned in vertical registry with the fill position, and includes a scale with a vertically reciprocating lift member thereon. The lift member selectively and sequentially extends through the open bottom portion of an associated one of the container support stations, and engages one of the containers positioned thereon to weigh the container and its contents. A controller is operably connected with the weighing apparatus and the motor, and is configured to rotate the container support table to shift a first, empty one of the containers into the fill position. The lift member is then extended to engage the first container in the fill position and supports the same and any parts therein on the scale until the predetermined cumulative weight is reached. The lift member is then retracted such that the first container and the parts therein are supported on the container support table. The controller then causes the motor to rotate the container support table to shift a second, empty one of the containers into the fill position.

Yet another aspect of the present invention is to provide a lot control and part handling apparatus having a plurality of containers, each of which is shaped to be filled with and retain therein multiple parts having a predetermined cumulative weight. A container support table is mounted for movement along a generally horizontal plane, and has a plurality of container support stations on which the containers are removably supported. A motor selectively moves the container support table to sequentially position each of the container support stations at a fill position at which the parts are loaded into an associated one of the containers. A weighing apparatus is positioned in vertical registry with the fill position, and includes a scale with a vertically reciprocating lift member thereon which selectively and sequentially engages an associated one of the containers. A controller is operably connected with the weighing apparatus and the motor, and is configured to move the container support table to shift a first, empty one of the containers into the fill position. The lift member is then extended to engage the first container which is in the fill position, and supports the same and any parts therein on the scale until the predetermined cumulative weight is reached. The lift member is then retracted such that the first container and the parts therein are supported on the container support table. The container support table is then moved again to shift a second, empty one of the containers into the fill position.

The principal object of the present invention is to provide an automatic lot control and part handling apparatus that accurately measures a lot size by weight and eliminates the final weighing step prior to packaging of the items. The lot size can be accurately maintained even if defective parts are removed from the containers.

These and other advantages of the invention will be further understood and appreciated by those skilled in the art by reference to the following written specification, claims, and appended drawings.

DETAILED DESCRIPTION OF THE PREFERRED EMBODIMENT

Figure 1:
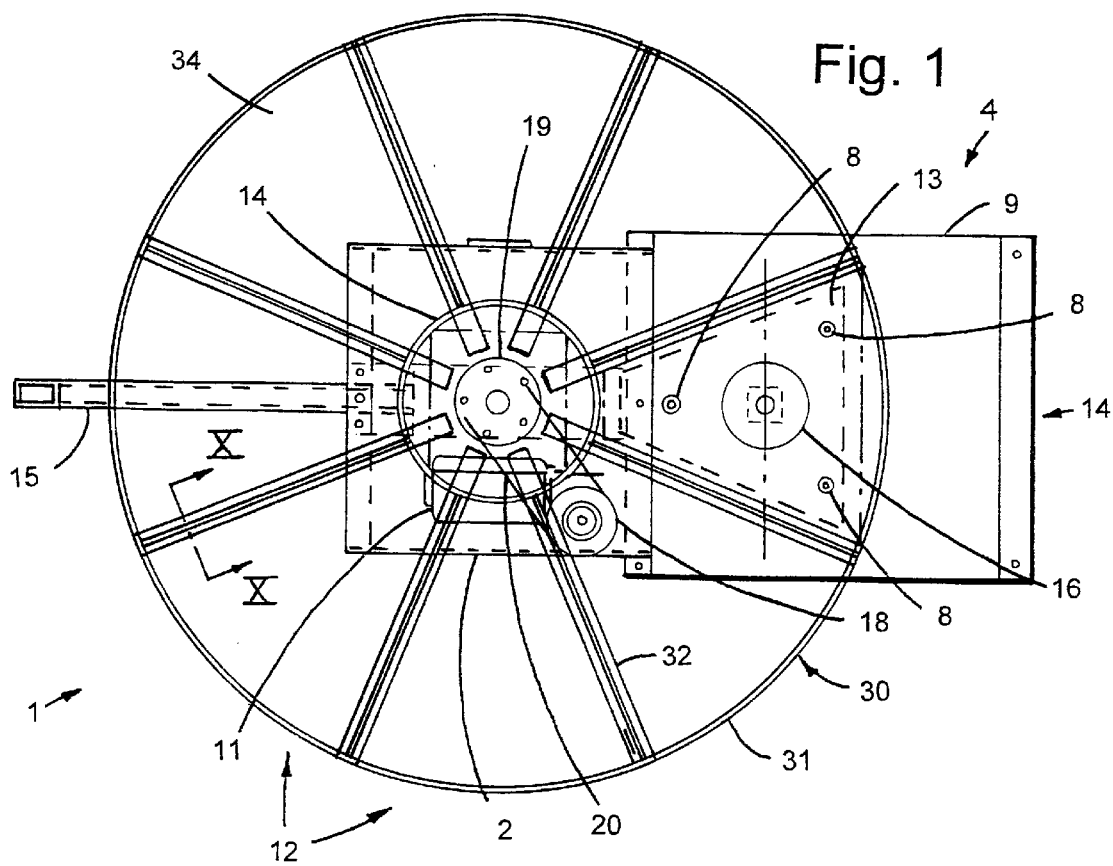
FIG. 1 is a top plan view of the lot control and part handling apparatus.
Figure 2:
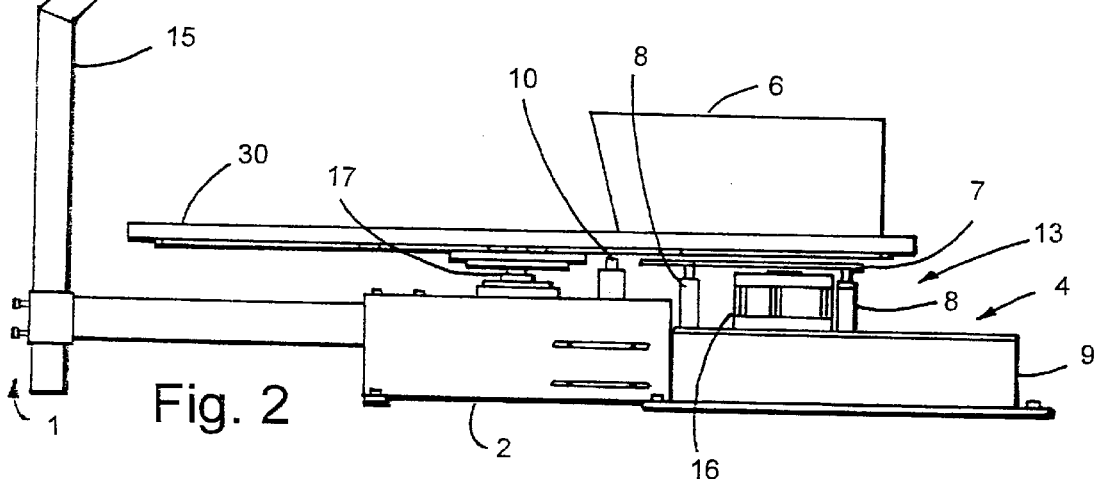
FIG. 2 is a side elevational view of the lot control and part handling apparatus.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations and step sequences, except where expressly specified to the contrary. It is also to be understood that specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a lot control and part handling apparatus embodying the present invention, which is designed for use in conjunction with fabrication machinery, such as a screw machine, or the like. As best seen in FIGS. 1 and 2, the present invention includes a base 2 that is adapted to support the lot control and part handling apparatus 1. A plurality of containers 6 are shaped to be filled with and retain therein multiple parts having a predetermined cumulative weight. A container support table 30 is mounted on the base 2 for rotation about a generally vertical axis. The container support table 30 has a plurality of container support stations 12 on which the containers 6 are removably supported. A motor 11 selectively rotates the container support table 30 to sequentially position each of the container support stations 12 at a fill position 14 at which the parts 3 are loaded into an associated one of the containers 6. A weighing apparatus 4 is positioned in vertical registry with the fill position 14, and includes a scale 9 with a vertically reciprocating lift member 13 located on the scale. The vertically reciprocating lift member 13 selectively and sequentially engages an associated one of the containers. A controller 5 is operably connected with the weighing apparatus 4 and the motor 11, and rotates the container support table 30 to shift a first, empty one of the containers 6 into the fill position 14. In the fill position the lift member 13 is extended to engage the first container 6 and support the container and any parts therein on the scale 9 until the predetermined cumulative weight is reached. The lift member 13 is then retracted such that the first container 6 and the parts therein are supported on the container support table 30. The controller then signals the motor to rotate the container support table 30 again to shift a second, empty one of the containers 6 into the fill position 14.

Figure 5:
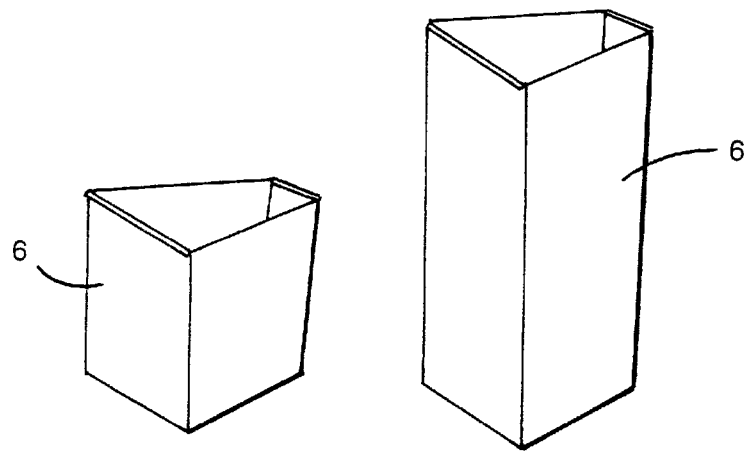
FIG. 5 is a side perspective view of two containers of different sizes.

As shown in FIG. 5, containers 6 are constructed from sheet metal and have a trapezoidal shape. Various height containers may be used, depending on the part size and number of parts per lot. Alternately, container support table 30 may be adapted to support conventional cardboard boxes (not shown), instead of the specially designed containers 6.

Figure 3:
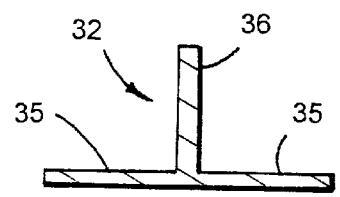
FIG. 3 is a cross-sectional view of a spoke shown in FIG. 1, taken along the line X—X, FIG. 1.

With reference to FIG. 1, container support table 30 has a plurality of spokes 32, attached to a hub 33 and a rim 31, forming a wheel shape. Spokes 32, hub 33 and rim 31 form trapezoidal shaped apertures 34. As shown in FIG. 3, each spoke 32 has an inverted T-shape, with the lower ledges 35 defining a support surface for the containers 6, with the gussets 36 acting as guides to locate the containers above the apertures 34 at the container support stations 12. A weighing device 4 includes a scale 9 on which a vertically reciprocating lift member 13 is located. The lift member 13 includes an air cylinder 16, guide pins 8, and plate member 7. The plate member 7 is attached to the air cylinder 16 and is guided and stabilized by guide pins 8. Guide pins 8 are conventional linear guides, such as pins and bushings which are old and well known in sheet metal stamping dies. Guide pins 8 extend and retract vertically to guide the lift member 13 in response to motion of lift member 13 in a manner which would be known to anyone familiar with various types of fabricating machinery. Plate member 7 has a trapezoidal shape corresponding to apertures 34 and moves upwardly through an aperture 34 upon actuation of the air cylinder 16. This allows a container 6 to be supported on plate member 7 when the air cylinder 16 is extended to lift the container 6 off the container support table 30. A frame member 15 is attached to the base 2, and supports controller 5. A sensor 10 is located adjacent the weighing device 4, and generates a signal to the controller 5 when a container 6 is located above the weighing device 4. A powered actuator such as electric motor 11 is mounted to the base 2 and rotates the container support table 30 by means of belt 20, which is supported on pulleys 18 and 19, in response to a signal from the controller 5.

Prior to operation, the operator may select either a time-interval mode of operation, or a weight-based mode of operation. In the time-interval mode of operation, the container support table 30 is rotated one step after an operator selected time-interval. The lot size in this mode of operation is determined by the rate of production of the parts, and the time-interval selected by the operator. In the weight-based mode of operation, the controller 5 rotates the container support table 30 one step after the weight in the container 6, which is collecting the parts, reaches a pre-determined amount of weight. In this mode, the lot size is based on the aggregate weight of the parts in the container 6. Since the lot size is measured by weight, defective parts may be removed from the container while it is in the fill position 14 without resetting a parts counter. An accurate lot size is thereby maintained with little or no extra effort by the operator.

Figure 4:
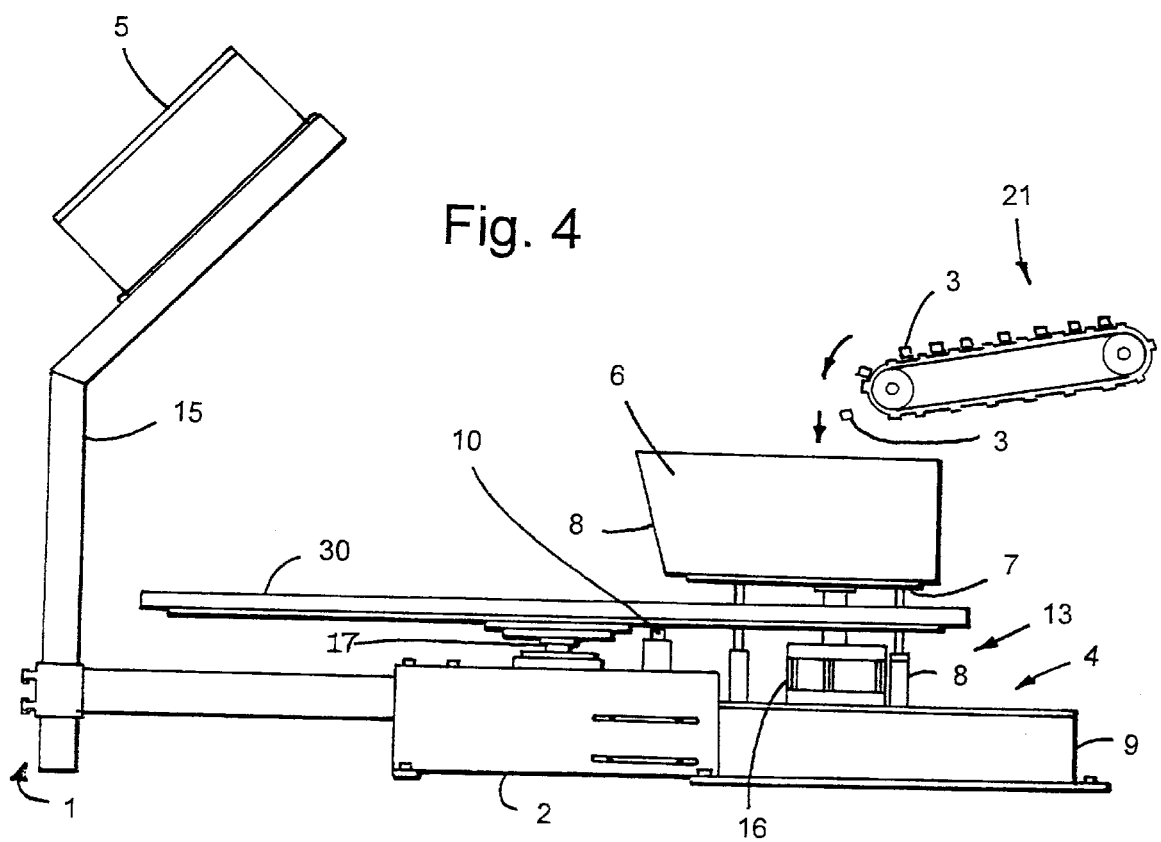
FIG. 4 is a side elevational view of the lot control and part handling apparatus with the lift member engaging a container.

During operation, a container 6 is placed below a parts feeder 21 of a fabrication machine at the fill position 14 for collecting parts as they exit the machine (FIG. 4). At the start of a cycle, the air cylinder 16 is actuated, extending plate member 7 through an aperture 34, such that the container 6 and its contents are supported on the plate member 7, thereby transferring the weight of the container 6 and the parts therein directly to the scale 9. Scale 9 generates a signal to the controller 5 to indicate the weight of a container 6 in the fill position 14. In the weight-based mode of operation, the controller 5 retracts the air cylinder 16 if a user-selected amount of weight is present in the container 6. After retraction of the air cylinder 16, the controller generates a signal to the electric motor 11, to rotate the container support table 30. When the sensor 10 generates a signal that a container is located directly above the weighing device 4, the controller 5 stops the rotation of the container support table 30, and generates a signal to the air cylinder 16, causing the air cylinder to actuate and raise the container 6 off the container support table 30, thereby initiating the next cycle. A container 6 that has been loaded with parts may be removed, and the parts packaged or moved to the next operation in the fabrication process. Since the container 6 is rotated from the fill position 14 based on the cumulative weight of the parts therein, defective parts may be removed from a container 6 in the fill position 14 without affecting the total number of parts in the lot.

In the time-interval mode of operation, the operation of the lot control and part handling apparatus is similar to that described above, except that each cycle occurs at an operator-selected time interval. At the start of a cycle, controller 5 generates a signal to retract the air cylinder 16 and rotate the container support table 30 based on the passing of a user-selected period of time. When the container support table 30 has rotated one step, the sensor 10 generates a signal to the controller 5. The controller 5 then generates a signal to the air cylinder 16 which actuates the air cylinder and lifts the container 6 off the container support table 30, thereby causing the weight of the container 6 and the contents thereof to be supported on the scale 9.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An apparatus for handling and counting discrete parts by cumulative weight, comprising:

a base adapted to support said apparatus;

a plurality of containers, each having a bottom, and being shaped to be filled with and retain therein multiple discrete parts which have an individual weight, such that a selected quantity of the discrete parts can be determined by a predetermined cumulative weight of the discrete parts;

a container support table mounted on said base for rotation about a generally vertical axis, and having a plurality of container support stations on which said containers are removably supported, wherein each of said container support stations has an open bottom;

a motor selectively rotating said container support table to sequentially position each of said container support stations at a fill position at which the discrete parts are loaded into an associated one of said containers;

a weighing apparatus positioned in vertical registry with said fill position, and including a scale with a vertically reciprocating lift member thereon which selectively and sequentially extends through the open bottom of an associated one of said container support stations, and abuttingly engages the bottom of said associated one of said containers;

a controller operably connected with said weighing apparatus and said motor, and rotating said container support table to shift a first, empty one of said containers into said fill position, wherein said lift member is extended to abuttingly engage the bottom of said first container and abuttingly support the same and any parts therein on said scale until said predetermined cumulative weight is reached, at which time said lift member is retracted to support said first container and the parts therein on said container support table, and subsequently rotate said container support table again to shift a second, empty one of said containers into said fill position, wherein said lift member is extended to abuttingly engage said bottom of said second container and abuttingly support the same and any parts therein on said scale until said predetermined cumulative weight is reached.

2. An apparatus as set forth in claim 1, wherein:

each of said container support stations of said container support table includes an opening through which said lift member extends to engage an associated one of said containers.

3. An apparatus as set forth in claim 2, including:

a sensor positioned to determine the relative positions of said container support table and said fill position, and operably connected with said controller to accurately and sequentially position said container support stations over said weighing apparatus.

4. An apparatus as set forth in claim 3, wherein:

said weighing apparatus includes a plate shaped to extend through the openings in said container support stations and abut a bottom portion of the associated one of said containers, at least three guides mounting said plate to said scale, and a vertically extending ram positioned between said plate and said scale and reciprocating said plate between fully extended and fully retracted positions.

5. An apparatus as set forth in claim 4, wherein:

said containers each have a generally trapezoidal top plan shape.

6. An apparatus as set forth in claim 5, wherein:

said containers are shaped to be positioned side-by-side on said container support table to form a closed polygon top plan shape.

7. An apparatus as set forth in claim 6, wherein:

said container support table has a spoked configuration with a central hub, an outer peripheral band, and a plurality of support channels extending radially between said hub and said band in a regular pattern to support bottom edges of said containers thereon.

8. An apparatus as set forth in claim 7, wherein:

said container support table has a generally circular top plan shape.

9. An apparatus as set forth in claim 8, wherein:

said motor is mounted on said base.

10. An apparatus as set forth in claim 9, wherein:

said weighing apparatus is mounted on said base.

11. An apparatus as set forth in claim 1, including:

a sensor positioned to determine the relative position of said container support table and said fill position, and operably connected with said controller to accurately and sequentially position said container support stations over said weighing apparatus.

12. An apparatus as set forth in claim 1, wherein:

each of said container support stations of said container support table includes an opening;

said weighing apparatus includes a plate shaped to extend through the openings in said container support stations and abut a bottom portion of the associated one of said containers, at least three guides mounting said plate to said scale, and a vertically extending ram positioned between said plate and said scale and reciprocating said plate between fully extended and fully retracted positions.

13. An apparatus as set forth in claim 1, wherein:

said containers each have a generally trapezoidal top plan shape, and are shaped to be positioned side-by-side on said container support table to form a closed polygon top plan shape.

14. An apparatus as set forth in claim 1, wherein:

said container support table has a spoked configuration with a central hub, an outer peripheral band, and a plurality of support channels extending radially between said hub and said band in a regular pattern to support bottom edges of said containers thereon.

15. A lot control and part handling apparatus, comprising:

a plurality of containers, each being shaped to be filled with and retain therein multiple discrete parts;

a container support table mounted for movement along a generally horizontal plane, and having a plurality of container support stations on which said containers are removably supported;

a motor selectively moving said container support table to sequentially position each of said container support stations at a fill position at which the parts are loaded into an associated one of said containers;

a weighing apparatus positioned in vertical registry with said fill position, and including a scale with a vertically reciprocating lift member thereon which selectively and sequentially engages an associated one of said containers;

a controller operably connected with said weighing apparatus and said motor, and configured to move said container support table to shift a first, empty one of said containers into said fill position for a predetermined time period, wherein said lift member is extended to engage said first container and support the same and any parts therein on said scale until said predetermined time period has expired, at which time said lift member is retracted to support said first container and the parts therein on said container support table, and subsequently move said container support table again to shift a second, empty one of said containers into said fill position for said predetermined time period.

16. An apparatus as set forth in claim 15, wherein:

each of said container support stations of said container support table includes an opening through which said lift member extends to engage an associated one of said containers.

17. An apparatus as set forth in claim 16, wherein:

said weighing apparatus includes a plate shaped to extend through the openings in said container support stations and abut a bottom portion of the associated one of said containers, at least three guides mounting said plate to said scale, and a vertically extending ram positioned between said plate and said scale and reciprocating said plate between fully extended and fully retracted positions.

18. A method for handling discrete parts, comprising:

providing a plurality of discrete parts;

providing a container support table mounted on a base for rotation about a generally vertical axis, and having a plurality of container support stations on which containers are removably supported;

positioning a weighing apparatus in vertical registry with the fill position, which includes a scale with a vertically reciprocating lift member thereon;

rotating the container support table to shift a first, empty one of the containers into the fill position;

extending the lift member to engage the first container, and support the same and any parts therein on the scale until a predetermined cumulative weight of the discrete parts is reached;

retracting the lift member to support the first container and the discrete parts therein on the container support table; and rotating the container support table again to shift a second, empty one of the containers into the fill position.

19. A method as set forth in claim 18, including:

positioning a sensor to determine the relative position of the container support table and the fill position to accurately and sequentially position the container support stations over the weighing apparatus.

20. A method as set forth in claim 19, including:

providing a fabrication machine producing said discrete parts adjacent said fill position;

placing said discrete parts in said first container;

removing said discrete parts from said first container; and shifting said first container into the fill position.

* * * * *